(No Model.)

T. A. HAYES.
FRICTION CLUTCH.

No. 519,951. Patented May 15, 1894.

Witnesses:

Inventor:
Thomas A. Hayes
by Mosher Curtis
Attys

UNITED STATES PATENT OFFICE.

THOMAS A. HAYES, OF WATERFORD, NEW YORK.

FRICTION-CLUTCH.

SPECIFICATION forming part of Letters Patent No. 519,951, dated May 15, 1894.

Application filed August 21, 1893. Serial No. 483,619. (No model.)

*To all whom it may concern:*

Be it known that I, THOMAS A. HAYES, a citizen of the United States, residing at Waterford, county of Saratoga, and State of New York, have invented certain new and useful Improvements in Friction-Clutches, of which the following is a specification.

My invention relates to such improvements and consists of the novel construction and combination of parts hereinafter described and subsequently claimed.

Reference may be had to the accompanying drawings, and the letters of reference marked thereon, which form a part of this specification.

Similar letters refer to similar parts in the several figures therein.

Figure 1:
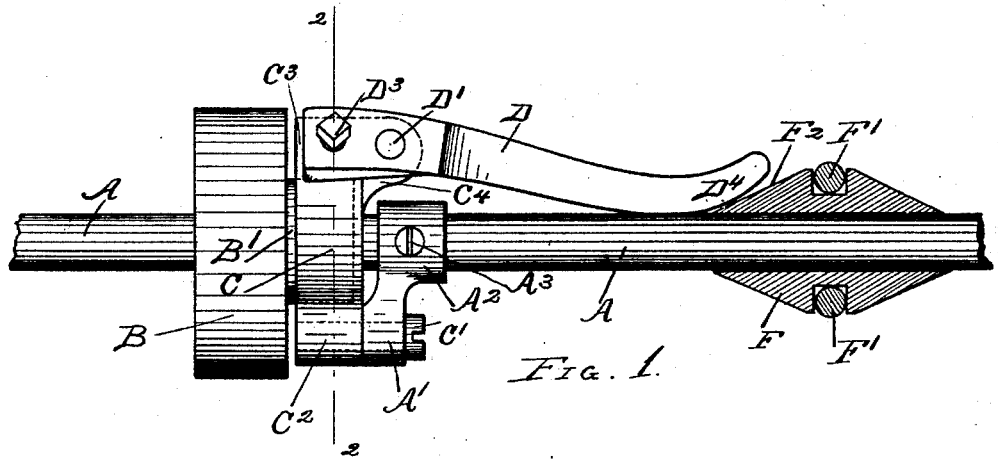
Figure 2:
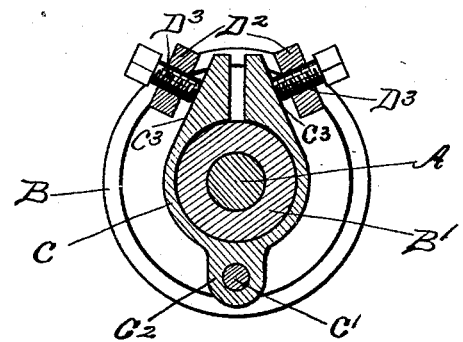
Figure 3:
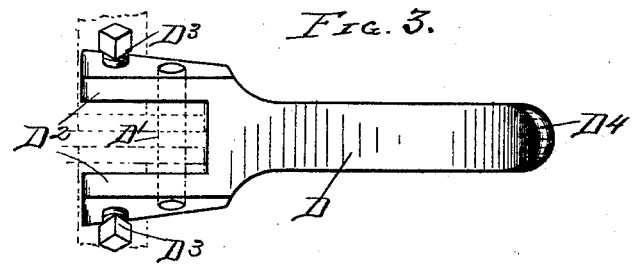

Figure 1 of the drawings is a view in side elevation of my improved friction-clutch applied to a rotary shaft, shown in part only. Fig. 2 is a vertical cross-section taken on the broken line 2—2, in Fig. 1. Fig. 3 is a top plan view of the bifurcated lever, detached.

A— is a rotary shaft, and B— a pulley loosely mounted thereon. The pulley is provided with a projecting hub, B'— which is inclosed by a bifurcated or split collar C—. The collar is fixed to rotate with the shaft by means of the pin or screw C'— inserted in suitable apertures in the lug $C^2$— on the collar, and the lug A'— on the sleeve $A^2$—, which sleeve is fixed upon the shaft by the set-screw $A^3$. The collar is provided on the outer sides of its bifurcate arms with the inclined surfaces or ways $C^3$— adapted to be engaged by an operating lever D—. The lever is fulcrumed intermediately of its ends upon the collar arms, or lateral extensions of the arms forming ears $C^4$— partly indicated by dotted lines, by means of the pin, D'— passing through the lever and the bifurcate arms of the collar, as indicated by dotted lines in Fig. 3. The lever is also bifurcated at one end and so arranged that its bifurcate arms $D^2$— inclose the collar arms. Each lever-arm is provided with an adjustable bearing-surface consisting of a screw $D^3$— inserted in a screw-threaded aperture in such arm, adapted to engage with the inclined way on the neighboring collar arm.

The lever D— may be operated in any known manner.

I have shown a well known device consisting of a sleeve F— movable longitudinally of the shaft and grooved to receive the bifurcate arms F'— of a shipping lever shown in part only, and provided with an incline $F^2$— up which the end $D^4$— of the lever is forced as the sleeve is slid toward it on the rotary shaft.

I am thus able to produce a cheap and simple clutch of great power that will not easily get out of order.

It is obvious that the split pulley may be fixed to the loose pulley and clutch a friction bearing fixed to rotate with the shaft, without departing from the spirit of my invention.

I am aware that a split collar having bifurcate arms embraced by lever arms carrying adjustable screws with points situated in conical depressions have been combined with means for raising the long arm of the lever and thereby causing the screws to engage the sides of the depressions and clamp the collar on a shaft and such devices I do not broadly claim. In such prior constructions the bearing faces are liable to be accidentally forced against the opposite side of the depression and so operate the clutch, whenever the hand accidentally rests upon the lever, or whenever it is depressed by any object falling upon it or even by its own weight. The ends of the screws also are more liable to wear than in my construction owing to their pointed form and this wear is at one side and affects the symmetry of the bearing faces. And further in such early constructions it is necessary to alter the adjustment of the bearing screws in order to remove the lever. By my improvement the bearing pins are presented at right angles to the inclined faces of the collar arms by which wear is reduced to a minimum and whereby said wear is evenly distributed on a plane at right angles to the axis of the screw. My lever can be removed by simply knocking out its fulcrum pin without altering the adjustment of the bearing pins and the latter can never become operative in any degree nor be subject to friction by the accidental depression of the lever.

What I claim as new, and desire to secure by Letters Patent, is—

1. In a friction clutch, the combination with two elements consisting of a rotary shaft and a pulley loose thereon, of a split collar fixed to rotate with one of such elements and inclosing a friction seat fixed on the other of such elements, a face on each of the collar arms having a practically continuous incline approximating the other inclined face at the extreme outer end of the arm, a bifurcated lever inclosing the collar arms between its own bifurcate arms and adapted to engage said inclines by a movement toward the shaft and by such movement only, and means for operating the bifurcated lever, substantially as set forth.

2. In a friction clutch, the combination of two elements consisting of a rotary shaft and a pulley loose thereon, of a split collar fixed to rotate with one of such elements, and inclosing a friction seat fixed on the other of such elements, an inclined face on each of the collar arms, having a substantially continuous incline approximating the inclined face at its outer end, a bifurcated lever inclosing the collar arms between its own bifurcate arms, pins or screws in said arms having each a bearing face at right angles to the axis of the screw and means for operating the bifurcated lever, substantially as set forth.

In testimony whereof I have hereunto set my hand this 4th day of August, 1893.

T. A. HAYES.

Witnesses:
GEO. A. MOSHER,
CHARLES S. BRINTNALL.